US007388968B2

(12) United States Patent
Rodman

(10) Patent No.: US 7,388,968 B2
(45) Date of Patent: Jun. 17, 2008

(54) METHOD AND DEVICE FOR LENGTH MEASUREMENT OF PACKAGING WEBS

(75) Inventor: Lars Rodman, Bjärred (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 559 days.

(21) Appl. No.: 10/296,128

(22) PCT Filed: May 22, 2001

(86) PCT No.: PCT/SE01/01151

§ 371 (c)(1),
(2), (4) Date: Apr. 21, 2003

(87) PCT Pub. No.: WO01/89834

PCT Pub. Date: Nov. 29, 2001

(65) Prior Publication Data

US 2003/0169454 A1 Sep. 11, 2003

(30) Foreign Application Priority Data

May 25, 2000 (SE) .................................... 0001946

(51) Int. Cl.
*G01B 5/02* (2006.01)
*G06K 1/00* (2006.01)

(52) U.S. Cl. ........................ 382/106; 700/125; 700/128; 702/158

(58) Field of Classification Search ................. 700/122, 700/125, 127, 128; 53/51, 64, 545, 548, 53/550; 702/158; 382/106; 156/252, 264, 156/517; 358/1.18; 356/909
See application file for complete search history.

(56) References Cited

U.S. PATENT DOCUMENTS

| | | | |
|---|---|---|---|
| 3,325,335 | A | 6/1967 | Martensson |
| 3,732,348 | A | 5/1973 | Ignell |
| 3,788,028 | A | 1/1974 | Folkesson et al. |
| 3,980,512 | A | 9/1976 | Rausér |
| 4,017,247 | A | 4/1977 | Soukup et al. |
| 4,043,520 | A | 8/1977 | Olsson et al. |
| 4,081,944 | A | 4/1978 | Sjöstrand |
| 4,133,710 | A | 1/1979 | Wartenberg |
| 4,174,200 | A | 11/1979 | Hoj |
| 4,256,791 | A | 3/1981 | Holmström et al. |
| 4,401,250 | A | 8/1983 | Carlsson |
| 4,460,425 | A | 7/1984 | Rausér et al. |
| 4,495,016 | A | 1/1985 | Viberg et al. |

(Continued)

FOREIGN PATENT DOCUMENTS

EP 0279147 A2 8/1988

(Continued)

*Primary Examiner*—Leo Picard
*Assistant Examiner*—Charles Kasenge
(74) *Attorney, Agent, or Firm*—Buchanan Ingersoll & Rooney PC

(57) ABSTRACT

The present invention concerns a method and a device for absolute measurement of a print repeat length and/or at least one package length of a moving packaging web (1) in line with a printing machine. Normally the print repeat length and one package length are measured and analysed simultaneously. The measurements are made by means of a number of CCD-cameras (2, 3, 4) connected to a computer (6) by means of a frame grabber (7).

20 Claims, 1 Drawing Sheet

U.S. PATENT DOCUMENTS

| | | | | | |
|---|---|---|---|---|---|
| 4,543,766 | A * | 10/1985 | Boshinski | 53/64 |
| 4,603,490 | A | 8/1986 | Hilmersson et al. | |
| 4,620,184 | A | 10/1986 | Nedstedt | |
| 4,629,638 | A | 12/1986 | Nilsson | |
| 4,657,614 | A | 4/1987 | Andersson | |
| 4,662,148 | A | 5/1987 | Nilsson | |
| 4,698,514 | A | 10/1987 | Hilmersson et al. | |
| 4,720,325 | A | 1/1988 | Rausing et al. | |
| 4,755,412 | A | 7/1988 | Glans et al. | |
| 4,807,420 | A * | 2/1989 | Barker | 53/51 |
| 4,835,720 | A * | 5/1989 | Ditto et al. | 702/158 |
| 4,961,149 | A * | 10/1990 | Schneider et al. | 700/135 |
| 4,994,310 | A | 2/1991 | Frisk et al. | |
| 5,018,213 | A | 5/1991 | Sikes | |
| 5,033,725 | A | 7/1991 | van Duursen | |
| 5,162,066 | A | 11/1992 | Martensson et al. | |
| 5,241,483 | A | 8/1993 | Porret et al. | |
| 5,565,059 | A * | 10/1996 | Edwards et al. | 156/517 |
| 5,572,433 | A * | 11/1996 | Falconer et al. | 700/127 |
| 5,809,894 | A | 9/1998 | Goldstein | |
| 5,902,222 | A | 5/1999 | Wessman | |
| 6,026,172 | A * | 2/2000 | Lewis et al. | 382/106 |
| 6,383,450 | B1 | 5/2002 | Lasson et al. | |

FOREIGN PATENT DOCUMENTS

| | | |
|---|---|---|
| EP | 0775660 A2 | 5/1997 |
| WO | 89/01867 | 3/1989 |
| WO | 99/12125 | 3/1999 |

* cited by examiner

METHOD AND DEVICE FOR LENGTH MEASUREMENT OF PACKAGING WEBS

FIELD OF THE INVENTION

The present invention concerns a method and a device for image measuring of a package web in line with a printing machine.

BACKGROUND OF THE INVENTION

If the package length of a packaging web is not correct there may be trouble at the filling machine. Thus, it is important to check the packaging web concerning the package length and possibly the print repeat length. The package length (PL) is defined as the length of each package in the packaging web. The print repeat length (PRL) is defined as the length of each turn of the printing roller on the packaging web.

It is previously known to use photocells often combined with a pulse counter to measure package lengths or the like on packaging web. As photocells measure only in one point the position of the photocells has to be amended for measurement of different package webs. Furthermore, when using a pulse counter the package length is only measured indirectly and the measurement may be inaccurate due to slip between the web and the rollers or the like.

SUMMARY OF THE INVENTION

One object of the present invention is to avoid the drawbacks of the prior art and to make absolute measurements on the package web. A further object is to control the PL and PRL for a packaging web in line with a printing machine.

Still a further object is to be able to measure both PRL and one PL simultaneously and to analyse the measurements simultaneously. Yet an object is to be able to measure on different packaging webs without having to make any physical adjustments of the measurement units.

The above objects are achieved by a method and a device having means for absolute measurement of at least the package length on a packaging web in line with a printing machine.

Further objects and advantages of the present invention will be obvious for a person skilled in the art when reading the detailed description below of preferred embodiments of the invention.

BRIEF DESCRIPTION OF THE DRAWINGS

The enclosed

DETAILED DESCRIPTION OF THE INVENTION

Figure 1:
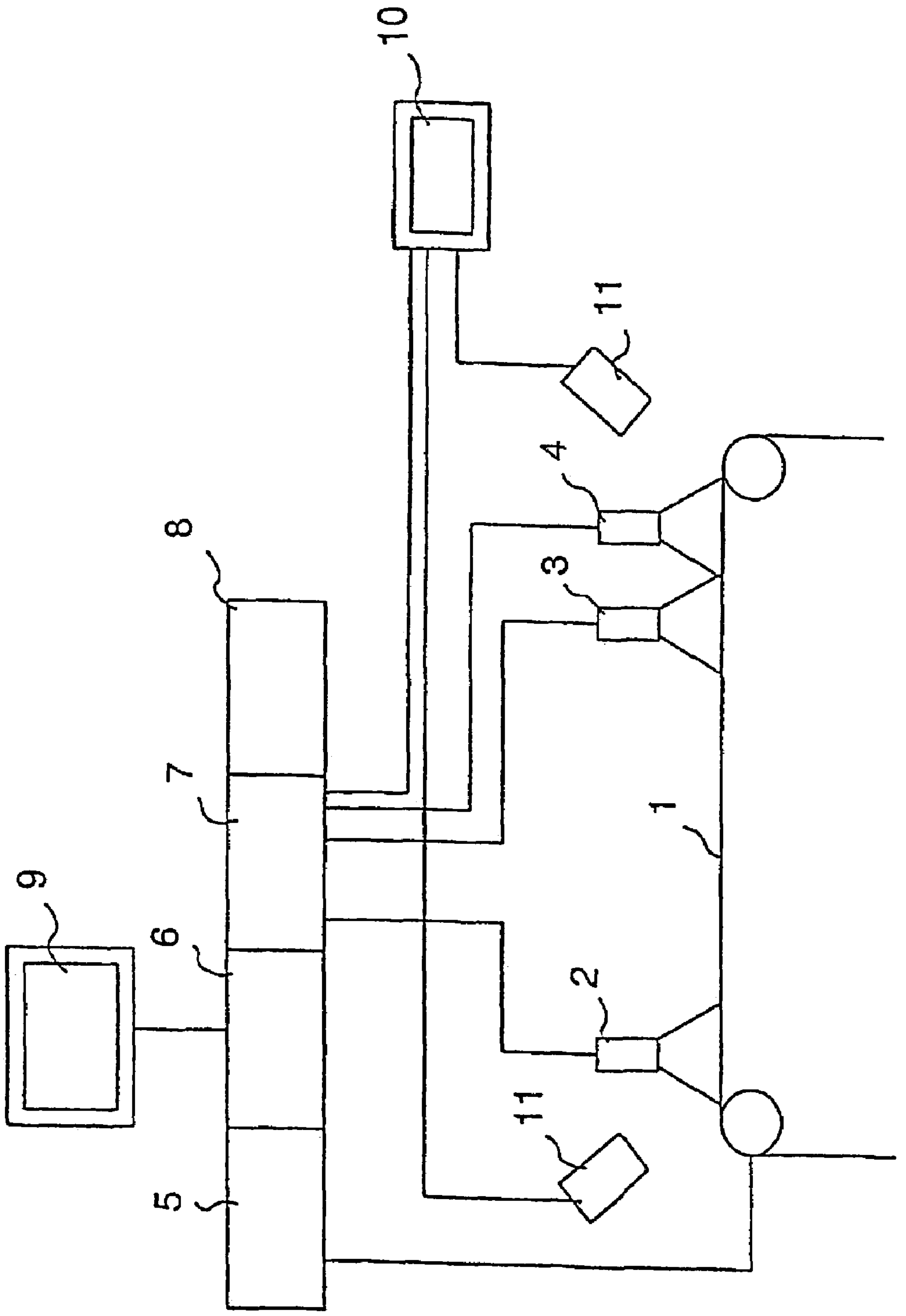
FIG. 1 is a diagrammatical view of a device according to the invention.

In the embodiment of FIG. 1 three CCD-cameras 2,3,4 are placed above a moving packaging web 1. The cameras 2-4 are placed in line with a printing machine (not shown) to take images of the packaging web 1. The cameras 2-4 cover the area where register codes are placed on the web 1. Each camera 2-4 is furnished with a matrix by means of which the different positions of the images are correlated to positions on the web 1 and whereby image effects such as distortion are compensated for.

In other embodiments of the invention another number of cameras is used. Depending on the resolution of the camera only one camera may be used or more than three cameras may be used covering the interesting regions.

The images of the cameras 2-4 are taken by means of a frame grabber 7. The images are then analysed by a computer The computer 6 displays information on a monitor 9. The computer 6 and frame grabber 7 are placed in a rack, e.g. a VME rack, together with an I/O board 5 and a possible connection to an ethernet 8. The I/O board is connected with a load cell measuring the tension of the web 1, also the speed of the web 1 is measured.

To illuminate the areas covered by the cameras 2-4 a flash unit 10 is provided connected to the frame grabber 7 and light units 11. The flash unit 10 and the frame grabber 7 are coordinated to illuminate the web 1 in time for the exposures.

In the print the web 1 is provided with register 5 codes indicating the ends of each print repeat length (PRL) and each package length (PL). The purpose of the system is to identify and determine the position of the register codes. The form of the register codes will vary to be able to identify different positions on the web. The register codes may also vary between different webs.

In the shown embodiment the first CCD-camera 2 will cover a web length of about 180 mm. The second and third CCD-cameras 3,4 will cover a partly overlapping web length of about 340 mm. The area covered by the second and third cameras 3,4 are placed at a distance from the centre of the first camera 2 which correspond to the expected PRL for a number of different packaging webs 1. The area covered by the second and third cameras 3,4 is big enough to cover at least one PL for each foreseen packaging web 1. The measuring unit of FIG. 1 is envisaged to cover measurements of different packaging webs 1, having a PL of about 110 to 340 mm and a PRL of about 470 to 750 mm. On every PRL there will be about 2 to 6 PL.

The cameras 2-4 should be mounted with the pixel 25 columns approximately parallel with the bars in the register code. One pixel in the camera should correspond to a certain distance of the web 1, e.g. 0.25 mm. The cameras 2-4 should be free of vibrations and for the specific material they should have the register codes in the middle of their covered areas.

The light units 11 should be mounted close to the packaging web 1. Furthermore, they should be mounted so they do not interfere with the regions of interest seen by the cameras 2-4 and that no direct light from the light units 11 reaches the cameras 2-4. The light units should be mounted in such a way, that the register codes for the specific material are in the middle of the illuminated area.

In order to have accurate measurements the packaging web 1 should not vibrate in the areas seen by the cameras 2-4 and should not move sideways more than ±4 mm.

The frame grabber 7 should be able to grab pictures from the three cameras 2-4 simultaneously. The I/O-board 5 should have several digital inputs and outputs (trigger, frame grabber, illumination), two timers for trigging of the frame grabber 7 and illumination (separately), at least two A/D channels (to convert the incoming web speed signal, 0-10V) and at least two D/A converters (to be able to control the illumination). The system should be able to run in at least the following modes:

1. Image grabbing mode.
2. Calibration mode.
3. Package length measurement mode.
4. Synchronising mode.
5. Print repeat and package length measurement mode.
6. Automatic mode.

During the image grabbing mode exposures are made of either one camera at the time or all three cameras simultaneously. The overlapped area of the second and third cameras 3,4 is adjusted in such a way that the positions of the cameras 3,4 give a 'distortion free' overlap. Correlation could be used during the adjustment of the cameras to optimise the overlapped area. Under the assumption that the cameras have a stable mounting, it will be enough to calculate the mean value of the pixel values in the overlapped region during the measurements of PRL and PL.

During the calibration mode a calibration of the system is performed by means of a ruler. The ruler contains several register codes. The calibration is performed for several positions of the ruler in the fields of view of the cameras 2-4. For each position of the ruler the positions of the register codes on the ruler are determined according to the routine for accurate determination of a register code position (defined below). As the real distances are known, a look-up table can be made and stored in a database. This table is then used during the measurements. For positions of register codes falling in between the calibrated positions in the look-up table, interpolation is used.

During the package length measurement mode the pictures from the second and third cameras 3,4 are analysed to find the two closest register codes. For small packages there are always at least two register codes seen. PL should in that case be determined for the register codes closest to the first camera 2. For big packages it might happen that only one code is seen. If only register code is seen, the images are dropped and a new set of images is taken after a randomised delay of time. Then a new analysis is made. The above steps are repeated until two register codes are present. When two register codes are found, the distance between them are determined and a lock-up table (stored) is used to determine the package size. As the package size is known the default PRL is known as well.

During the synchronising mode the image of the first 25 camera 2 is analysed to find a register code. The images of the other cameras 3,4 are also stored. If no register code is found the images are dropped and a new set of images is taken after a randomised delay of time. This is repeated until a register code is found and placed close to the centre of the image of the first camera 2. If the register code is not close to the centre of the first camera 2, it is impossible to determine the PRL for some package sizes. As the default PRL and the web speed are known, the time delay between the exposures are calculated and controlled in such a way that the register code is forced to move towards the centre in the next exposure. A new measurement is normally made for each PRL and one PL. The regions of interest (ROI) analysed in the images from each camera 2-4 could be minimised as the approximate position of the register codes in each picture is known. As the ROI:s are minimised the demands of the computer for analyse are limited.

During the PRL and PL measurement mode a set of pictures is taken. The regions of interest are analysed in each picture to find and determine the position of the register codes and to calculate PRL and PL.

During the automatic mode the system automatically will change from the PL measurement mode to the synchronisation mode and to the PRL and PL measurement mode. As soon as the PL is determined the synchronisation mode is started. As soon as the synchronisation is within the predetermined limits the PRL and PL measurement mode is started. As the approximate positions of the register codes are known the ROI of each image is minimised to improve the image processing speed. If one register code is missing in any of the defined ROI a new set of pictures is taken and analysed. If there still is a code missing a restart of the PL measuring mode will be done followed by the synchronisation mode and so on.

The time delay between exposures is set so that the web 1 "jumps" forward with one package for every new measurement. This is done to get a measurement of each PRL and PL present on the specific material. This may be done in the following way. First the PRL is measured by using the register codes at the ends of each PRL. The next measurement of PRL is made between the first register code after the end code on two adjacent print lengths and so on until the PRL has been measured from all register codes. During each measurement of the PRL one measurement of the PL is made by means of the second and third cameras 3,4. Thus, after the above cycle the PL of each package in one PRL is measured. The calculation of the time delay may be done as all the parameters are known (PRL, PL, web speed, position of the register code in the first camera 2).

By the method and the device of the invention the PRL and PL:s of different packaging webs 1 are measured absolute, i.e. PRL and PL is determined by direct measurement on the actual web. Furthermore, several register codes at different locations on the web are measured simultaneously.

One of the digital outputs in the I/O-board is used to trigger the exposures. The routine is different in the different modes. In the PL measurement mode it is randomised until two register codes are seen with the second and third cameras 3,4. In the synchronising mode it is randomised until one register code is seen with the first camera 2. In all other modes the time is calculated and thereby controlled by the system. The time interval within which the time should vary randomly is preferably about 25% of the time it takes for 750 mm of the packaging web 1 to pass at the web speed at the time for measurement. Both the time between measurements and the time limits for the random variation is inversely proportional to the web speed. Furthermore the exposure time may be changed manually. Preferably the exposure time should be possible to vary between 10 μs and 200 μs. The length of the trigger pulse to the cameras 2,3,4 defines the exposure time. Normally the same trigger is used to the cameras 2,3,4, the frame grabber 7, and the illumination 10,11. The routines are equal to all three outputs, but the time for triggering and the pulse length could be different in all three cases. In an alternative embodiment a single trigger is used to each output.

One A/D-channel of the I/O-board is implemented to read the web speed once every measurement cycle. It is assumed that the read value is linearly proportional to the web speed. Normally 0-10 volts correspond to 0-1000 m/mm, but the web speed value needs to be calibrated for each machine. It will be enough to multiply the incoming value with a factor determined by a manual calibration. This factor is manually set in the graphical user interface (GUI). The speed value is filtered by a mean value calculation over a number of the latest measurements, e.g. the eight latest measurements.

The image processing part contains three different 10 routines: One for finding the correct register code size. One for determining its position roughly. One for determining its position accurately.

The register codes exist in a number of different sizes whose data is stored in a database. The size of the codes depends on the package size of the material. At start up the size of the code is unknown. Initially the regions of interest (ROI) of the second and third cameras 3,4 are set to cover two stripes. These ROI will make it possible to find the size of register codes as they cover the areas where the bars of the register codes will pass. The codes have three and four bars respectively. One threshold is used to turn all pixels black below that threshold and the rest white. The data is reduced by summing all columns to one row for each of the ROI. It is normally enough to use only one ROI to determine the register code size. To find the register code(s) correlation is used, i.e. the peak value(s) is found in a correlation curve between the data and a known reference pattern. In practice a lot of multiplications and summations are done over and over again while the reference pattern is moved, one column at the time, from one end of the row of data to the other. This is repeated with all register code sizes. A bipolar reference pattern is used, i.e. the black parts are negative and the white parts are positive. There will be a significant difference in the peak values for the different register codes. This algorithm is based on the assumption that there are no similar patterns in the different print of the packages. Thereby it will be no problem to determine which register code that is used on the material.

For the rest of the measurements the following method is used. First the position is determined roughly. As the reference pattern is symmetrical and placed in the middle of the correlation window (the width of the window varies with the size of the register code), the peak(s) of the correlation curve determines the position of the register code(s). The middle of the register code is actually placed a half window size to the left or to the right of the peak, depending on from which direction the correlation is performed. Each peak, above an empirically determined threshold, tells the position of each register code if more than one is detected in the area. Thereafter, PL is determined roughly by calculating the number of columns between two peaks and multiplying with the distance each pixel corresponds to, nominally 0.25 mm. Finally, the position is determined accurately. This may be done in different ways depending on in which mode the system is running. In the PL mode and the synchronisation mode it is enough with a rough determination of the register code positions. In the combined PRL and PL mode the register codes are accurately determined by using five thresholds in finding each edge of each bar in the register code. In this mode the ROI:s are different from the ROI:s of the previous modes, as the positions of the register codes now are roughly known. No compressing of data to one row is used, as the codes not necessarily are parallel with the columns in the CCD cameras 2,3,4.

In a data base data for the different register codes sizes, the PL for different packages and the PRL for different packages are stored.

The graphical user interface (GUI) is made with the purpose to make it easy to perform all above defined functions, measurements and parameter settings. It is also made in a way that makes it easy to verify the functions and the performance of the system. Results are normally presented in histograms and diagrams and are stored on file for both PRL and PL measurements.

The invention claimed is:

1. A method for measurement on a moving packaging web, comprising:

taking images of one surface of the moving packaging web with at least two cameras spaced apart from one another along a path of movement of the moving packaging web; and measuring an absolute value of a print repeat length (PRL) and/or at least one package length (PL) on the web in line with a printing machine through use of the images of the one surface of the web taken by the two cameras.

2. The method of claim 1, wherein the measuring of the absolute value is made by use of printed register codes on the web, which register codes are printed at an end of each package length and print repeat length, wherein the print repeat length and at least one package length are measured and analyzed simultaneously.

3. The method of claim 1, wherein the images of the one surface of the web are taken by three CCD-cameras which take images of regions of interest on the web, which regions are regions including one or more register codes.

4. The method of claim 1, wherein the at least two cameras include second and third CCD-cameras placed adjacent each other at a distance from a first CCD camera; the second and third cameras cover covering a partly overlapped region; and a distance between the images taken by the first camera and the second and third cameras covers the print repeat length for a number of different packaging webs.

5. The method of claim 4, wherein the region covered by the second and third cameras is big enough to enclose at least one print length; that the overlapped area of the second and, third cameras is calibrated; and that each print repeat length of the web is measured.

6. The method of claim 1, further comprising taking images of regions of interest on the web and analyzing the regions of interest on each image, and wherein the region of interest analyzed on each image is minimized by stored sizes for different package sizes and by analyzing an actual web speed and tension and latest preceding measurements, and the regions of interest on the web are illuminated during image taking.

7. The method of claim 6, wherein illumination is made by a flash unit trigged automatically.

8. The method of claim 1, wherein the images are transferred to a computer by a frame grabber and that all cameras take images simultaneously, which images are analyzed simultaneously.

9. The method of claim 1, wherein at least the following modes are available: an image grabbing mode, a calibration mode, a package length measurement mode, a synchronizing mode, a print repeat and package length mode and an automatic mode, and that in the automatic mode mode the system automatically changes between the package length measurement mode, the synchronizing mode and the print repeat and package length mode.

10. The method of claim 1, wherein the print repeat length and the at least one package length are measured and analyzed simultaneously.

11. A method for measurement on a moving packaging web, comprising measuring an absolute value of a print repeat length (PRL) and/or at least one package length (PL) on the web in line with a printing machine, with at least one CCD-camera being used to take images of regions of interest on the web, which regions are regions including one or more register codes, and wherein time intervals at which the images are taken are synchronized in view of actual data concerning package size, the print repeat length, web speed, web tension in such a way that register code for print repeat length is centered in the image of at least one CCD-camera.

12. A method for measurement on a moving packaging web, comprising taking images of regions of interest on the web with at least two cameras and measuring an absolute value of a print repeat length (PRL) and/or at least one package length (PL) on the web in line with a printing machine through use of the images, wherein at least the following modes are available: an image grabbing mode, a calibration mode, a package length measurement mode, a mode, a print repeat and package length mode and an automatic mode; and in the automatic mode an automatic changing occurs between the package length measurement mode, the synchronizing mode and the print repeat and package length mode, and wherein during the synchronizing mode a timing of exposures of each camera is adapted to actual measured lengths and condition of the web and that stored values regarding register codes, package lengths and print repeat lengths for different packages are used to control timing of the measuring.

13. A length measuring device for a moving packaging web, comprising:

at least two cameras positioned at spaced apart locations on a common side of a movement path along which the packaging web is adapted to move to take images of a common surface of the web; and means for absolute measurement of a print repeat length (PRL) and/or at least one package length (PL) of the packaging web in line with a printing machine using the images taken by the at least two cameras.

14. The device of claim 13, wherein the means simultaneously measures the print repeat length and the at least one package length.

15. The device of claim 14, wherein the at least two cameras comprise a first CCD-camera, a second CCD-camera and a third CCD-camera, and wherein the first CCD-camera is positioned at a distance from the second and third CCD-cameras, which distance corresponds to the print repeat length of a number of different packaging webs.

16. The device of claim 13, wherein further comprising means for illumination of areas of the common surface of the web in which images are taken by the cameras.

17. The device of claim 16, wherein the illumination means are light units controlled by a computer by a flash unit for co-ordination with the cameras.

18. The device of claim 13, wherein the at least two cameras are connected to a computer by a frame grabber.

19. The device of claim 13, wherein the at least two cameras comprise a first CCD-camera, a second CCD-camera and a third CCD-camera, and wherein the first CCD-camera is positioned at a distance from the second and third CCD-cameras that is greater than the distance between the second and third CCD-cameras.

20. A length measuring device for a moving packaging web comprising:

a first CCD-camera positioned at a distance from second and third CCD-cameras, which distance corresponds to a print repeat length of a number of different packaging webs;

means for absolute measurement of a print repeat length (PRL) and/or at least one package length (PL) of the packaging web in line with a printing machine;

wherein the means are provided for simultaneous measurement of the print repeat length and the at least one package length and/or the means for measurements includes a computer connected to the first, second and third CCD-cameras by a frame grabber;

wherein the second and third CCD-cameras together cover a partly overlapping area, which area is big enough to include at least one package length; and means for measurement of speed and tension of the package web.

* * * * *